United States Patent
Miller (10) Patent No.: US 9,359,898 B2
(45) Date of Patent: Jun. 7, 2016

(54) SYSTEMS FOR HEATING ROTOR DISKS IN A TURBOMACHINE

(75) Inventor: Christopher Edward Miller, Fletcher, NC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 985 days.

(21) Appl. No.: 13/450,791

(22) Filed: Apr. 19, 2012

(65) Prior Publication Data

US 2013/0280071 A1  Oct. 24, 2013

(51) Int. Cl.
*F01D 25/10* (2006.01)
*F01D 5/08* (2006.01)
*F01D 11/24* (2006.01)

(52) U.S. Cl.
CPC *F01D 5/08* (2013.01); *F01D 11/24* (2013.01); *F01D 25/10* (2013.01); *Y02T 50/676* (2013.01)

(58) Field of Classification Search
CPC ......... F01D 5/08; F01D 11/24; F01D 25/005; F01D 25/10; F01D 5/25; F01D 5/282; F01D 5/284
See application file for complete search history.

(56) References Cited

U.S. PATENT DOCUMENTS

| | | | |
|---|---|---|---|
| 2,703,922 A | 3/1955 | Brauchler et al. | |
| 2,891,307 A | 6/1959 | Betteridge | |
| 3,318,573 A | 5/1967 | Matsuki et al. | |
| 3,405,290 A | 10/1968 | Halas | |
| 4,123,199 A | 10/1978 | Shimizu et al. | |
| 4,184,797 A | 1/1980 | Anderson et al. | |
| 5,080,556 A | 1/1992 | Carreno | |
| 5,135,355 A | 8/1992 | Colley et al. | |
| 6,630,650 B2 * | 10/2003 | Bassill et al. | 219/626 |
| 7,258,526 B2 | 8/2007 | Dooley et al. | |
| 8,573,932 B2 | 11/2013 | Ross et al. | |
| 8,695,342 B2 | 4/2014 | Fredriksson et al. | |
| 2006/0285968 A1 | 12/2006 | Riahi et al. | |
| 2007/0187381 A1 * | 8/2007 | Vontell et al. | 219/202 |
| 2007/0205101 A1 * | 9/2007 | Ye et al. | 204/298.12 |
| 2009/0316748 A1 | 12/2009 | Wawrzonek et al. | |
| 2011/0308251 A1 | 12/2011 | Heue | |

* cited by examiner

*Primary Examiner* — Craig Kim
*Assistant Examiner* — Maxime Adjagbe
(74) *Attorney, Agent, or Firm* — Fletcher Yoder, P.C.

(57) ABSTRACT

A system includes a turbomachine. The turbomachine includes at least one rotor disk. The system also includes a rotor disk heating system configured to resistively heat at least a portion of the at least one rotor disk via an electrical current or voltage applied to the portion of the at least one rotor disk.

15 Claims, 5 Drawing Sheets

SYSTEMS FOR HEATING ROTOR DISKS IN A TURBOMACHINE

BACKGROUND OF THE INVENTION

The subject matter disclosed herein relates to systems for heating rotor disks in various types of turbomachines such as compressors and gas turbines.

Turbomachine or rotary systems, such as compressors and turbines (e.g., gas turbines, steam turbines, etc.), may generally include a rotor portion that rotates about an axis during the operation of the system. For example, in a compressor of a gas turbine, the rotor portion may include a number of blades disposed about a shaft. During operation of the compressor of the gas turbine, this shaft may rotate, causing the attached blades to rotate. However, the temperature present within the compressor of the gas turbine may be high (e.g., in excess of approximately 426° C.). In particular, during transient events (e.g., cold start up of the gas turbine), portions (e.g., radial outer portion) of the rotor disks of the compressor may be heated from a flow path air (e.g., compressed air), while other portions of the rotor disks may not receive as much heating. This leads to a varied temperature profile along a radial cross-section of the rotor disk, which may result in a high stress condition that may adversely affect the life of the disk.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a turbomachine. The turbomachine includes at least one rotor disk. The system also includes a rotor disk heating system configured to resistively heat at least a portion of the at least one rotor disk via an electrical current or voltage applied to the portion of the at least one rotor disk.

In accordance with a second embodiment, a system includes a rotary machine. The rotary machine includes at least one rotor disk. The at least one rotor disk includes an annular surface having an inner perimeter and an outer perimeter, and grooves within the annular surface. The system also includes a rotor disk heating system that includes a resistive network disposed within the grooves below the annular surface. Portions of the resistive network include a multilayered heating material. The resistive network is configured to resistively heat at least a portion of the at least one rotor disk via an electrical current or voltage.

In accordance with a third embodiment, a system includes a rotary machine. The rotary machine includes at least one rotor disk. The at least one rotor disk includes an annular surface. The system also includes a rotor disk heating system configured to resistively heat at least a portion of the at least one rotor via an electrical current or voltage applied to the portion of the at least one rotor disk, wherein the rotor disk heating system includes a multilayered heating material disposed on the annular surface of the at least one rotor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems for heating the rotor disks of rotary machines (e.g., compressor or turbine) of a turbomachine (e.g., gas turbine system). During transient events (e.g., cold start up of a gas turbine), portions (e.g., radial outer portion) of the rotor disks may be heated from a flow path air (e.g., compressed air), while other portions of the rotor disks may not receive as much heating resulting in a varied temperature profile along a radial cross-section of the rotor disks. To counter this varied temperature profile, a rotor disk heating system resistively heats at least a portion of one or more rotor disks via an electrical current or voltage. The electrical current or voltage may be applied to a resistive network (e.g., shaped as a spider web or grid) having a multilayered heating material disposed within grooves on an annular surface of the rotor disk. Alternatively, the electrical current or voltage may be applied to a multilayered heating material continuously disposed on at least an annular portion of the annular surface of the rotor disk. The multilayered heating material may include a dielectric layer (e.g., diamond powder) having a high thermal conductivity disposed directly on a surface of the grooves or on the annular surface, followed by a resistive heating layer disposed on the dielectric layer. The rotor disk heating system may vary the heating between portions of the rotor disk to ensure even heating of the rotor disk. In certain embodiments, the rotor disk heating control system may include a controller to control the electrical current or voltage applied to the rotor disk based on feedback from a sensor. In some embodiments, a removable probe may couple to a socket coupled to one or more rotor disks to supply the power to heat the disks. The rotor disk heating system enables variable temperature compensation for the rotor disks to improve the cyclic life of the rotor disks. In addition, the rotor disk heating system enables control of blade tip clearance (e.g., during startup) within the turbomachine.

Figure 1:
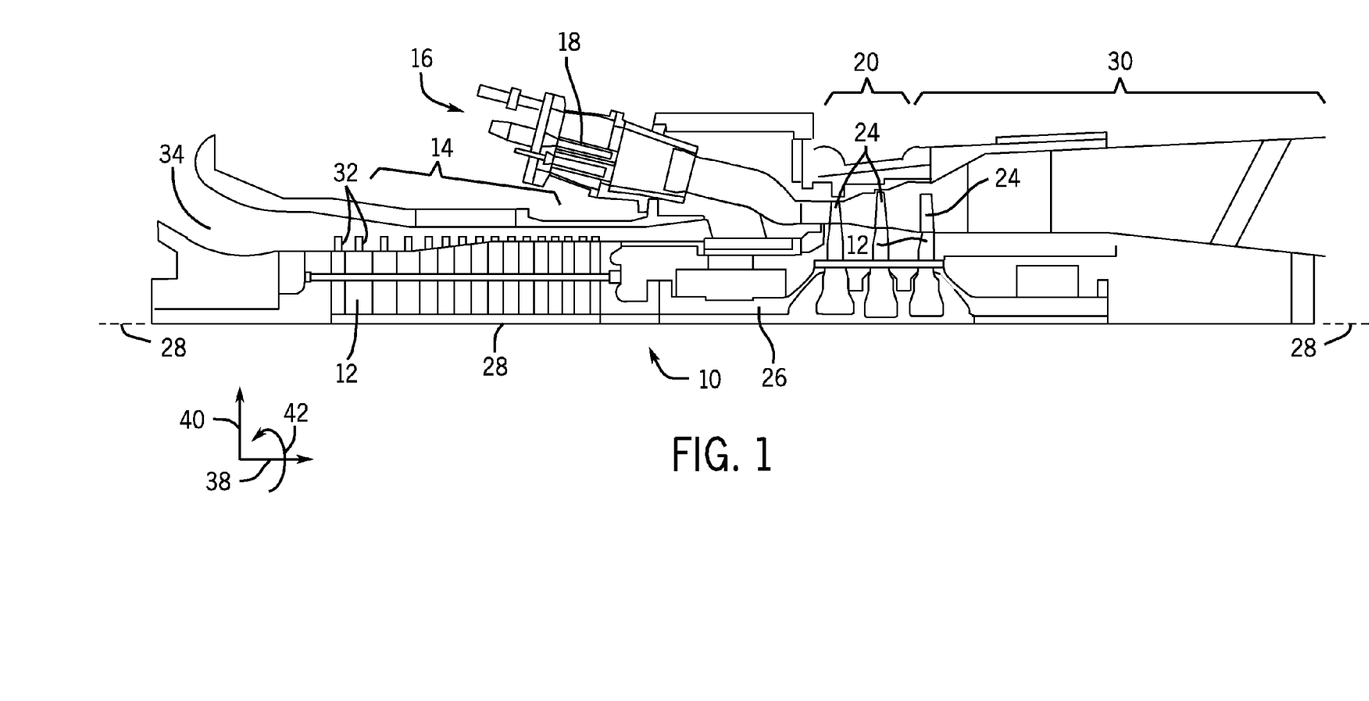
FIG. 1 is a cross-sectional side view of an embodiment of a turbomachine system (e.g., gas turbine system) including a compressor and turbine having a rotor disk heating system.

Turning now to the drawings, FIG. 1 illustrates an embodiment of a turbomachine system 10 (e.g., gas turbine system) having a rotor disk heating system. The rotor disk heating system, described in detail below, may resistively heat at least a portion of one or more rotor disks 12 to improve the cyclic life of the rotor disks 12 and control blade tip clearance within the turbomachine system 10. In particular, the rotor disk heating system enables variable temperature compensation to ensure even heating across an annular surface of the rotor disks 12. The system 10 includes a compressor 14 (e.g., rotary machine), combustors 16 having fuel nozzles 18, and a turbine 20 (e.g., rotary machine). The fuel nozzles 18 route a liquid fuel and/or gas fuel, such as natural gas or syngas, into the combustors 16. The combustors 16 ignite and combust a fuel-air mixture, and then pass hot pressurized combustion gases (e.g., exhaust) into the turbine 20. Turbine blades 24 are coupled to the rotor disks 12 rotatably attached to a shaft 26, which is also coupled to several other components throughout the turbomachine system 10, as illustrated. As the combustion gases pass through the turbine blades 24 in the turbine 20, the turbine 20 is driven into rotation, which causes the shaft 26 to rotate about a rotational axis 28. Eventually, the combustion gases exit the turbine 20 via an exhaust outlet 30.

In the illustrated embodiment, the compressor 14 includes compressor blades 32. The compressor blades 32 within the compressor 14 are coupled to the rotor disks 12 and rotate as the rotor disks 12 of the compressor 14 (which form a shaft) are driven into rotation by the turbine 20. As the compressor blades 32 rotate within the compressor 14, the blades 32 compress air from an air intake 34 into pressurized air, which may be routed to the combustors 16, the fuel nozzles 18, and other portions of the turbomachine system 10. The fuel nozzles 18 may then mix the pressurized air and fuel to produce a suitable fuel-air mixture, which combusts in the combustors 16 to generate the combustion gases to drive the turbine 20. Further, the shaft 26 may be coupled to a load, which may be powered via rotation of the shaft 26. By way of example, the load may be any suitable device that may generate power via the rotational output of the turbomachine system 10, such as a power generation plant or an external mechanical load. For instance, the load may include an electrical generator, a propeller of an airplane, and so forth. In the following discussion, reference may be made to various directions, such as an axial direction or axis 38, a radial direction or axis 40, and a circumferential direction or axis 42. The axial direction 38 is generally oriented along the rotational axis 28.

Figure 2:
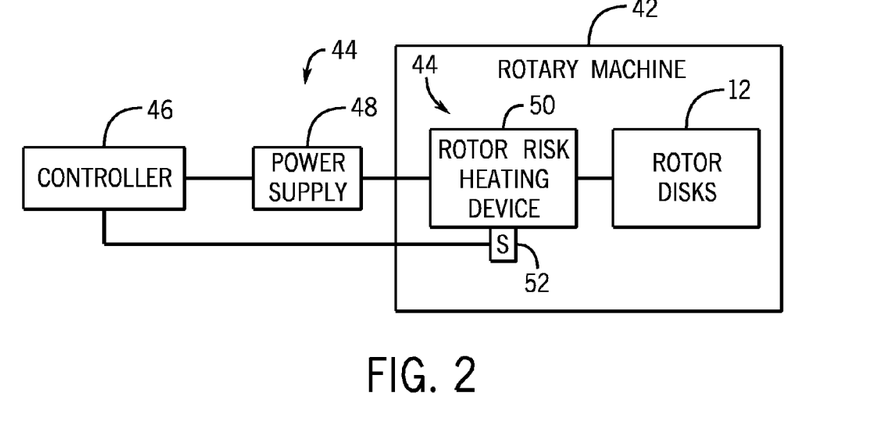
FIG. 2 is a schematic block diagram of an embodiment of a rotary machine having rotor disk heating system that includes a controller and power supply.

FIG. 2 schematic block diagram of an embodiment of a rotary machine 42 (e.g., compressor 14 or turbine 20) having a rotor disk heating system 44 that includes a controller 46 and a power supply 48. As described above, the rotary machine 42 includes rotor disks 12. The rotor disk heating system 44 includes a rotor disk heating device 50 coupled to one or more of the rotor disks 12. As described in greater detail below, the rotor disk heating device 50 may include a restive network disposed on one or more of the rotor disks 12 to apply the electrical current or voltage for heating. The resistive network includes a multilayered heating material. In certain embodiments, the resistive network may be disposed within grooves within an annular surface of one or more rotor disks 12. Alternatively, as described in greater detail below, the rotor disk heating device 50 may include a multilayered heating material disposed (e.g., continuously) along the annular surface of one or more rotor disks 12. In certain embodiments, the continuous layer of multilayered heating material may be divided into separate sections to enable varying the electrical current or voltage applied to each separate section individually.

As described in greater detail below, the multilayered heating material includes a first dielectric layer having a high thermal conductivity (e.g., diamond powder) disposed on the annular surface or on a surface of the grooves of the one or more rotor disks 12. In addition, the multilayered heating material includes a resistive heating layer disposed on the first dielectric layer. Further, the multilayered heating material may include a second dielectric layer having a low thermal conductivity (e.g., thermal barrier coating (TBC) such as a ceramic blanket or environmental barrier coating) disposed on the resistive heating layer for environmental protection and/or insulating purposes.

The rotor disk heating system 44 is configured to heat at least a portion of the at least one rotor disk 12 via an electrical current or voltage applied to the portion of the at least one rotor disk 12. In particular, the power supply 48 provides power to the rotor disk heating device 50 coupled to the one or more rotor disks 12. In certain embodiments, the power for the power supply 48 may be produced inside the rotary machine 42. For example, the rotor shaft 26 or rotor disks 12 may act as alternator and generate a magnetic force to generate the power. This enables power to be provided to the rotor disk heating device 50 during operation of the rotary machine 42 (e.g., rotation of the rotor disks 12). In some embodiments, the power from the power supply 48 may be routed from outside the rotary machine 42 to the one or more rotor disks 12. For example, leads from the power supply 48 may be routed along the shaft 26 to the one or more rotor disks 12 using a slip ring and/or brush device. This also enables power to be provided to the rotor disk heating device 50 during operation of the rotary machine 42 (e.g., rotation of the rotor disks 12). In other embodiments, the power supply 48 may be a removable (and/or retractable) probe (see FIGS. 11 and 12) that may enter a casing of the rotary machine 42 via a port (e.g., boroscope port) to provide the power for heating the one or more rotor disks 12, while the rotor disks 12 of the rotary machine 42 are at rest (e.g., prior to a cold start event).

The power supply 48 is controlled by the controller 46. In particular, the controller 46 controls the electrical current or voltage applied to one or more rotor disks 12. In certain embodiments, the controller 46 may control the electrical current or voltage applied based on feedback from one or more sensors 52 (e.g., thermocouples) associated with the rotor disk heating device 50 for one or more rotor disks 12. In certain embodiments, the controller 46 may be integrated in the removable probe. For example, the controller 46 may monitor and control the applied electrical current or voltage based on direct feedback from the sensors 52. Alternatively, the controller 46 may utilize a model-based approach using current, voltage, or resistance sensing to control a temperature and/or electrical current or voltage supplied to the rotor disk heating device 50. In addition, the rotor disk heating system 44 may vary the heating between portions of the rotor disk 12. This heating may be varied via the controller 46 and/or the design of the rotor disk heating device 50 (e.g., segmented sections or radial spacing). The variable temperature compensation enables even heating of the one or more rotor disks 12 to increase the cyclic life of the rotor disks 12. In addition, the rotor disk heating system enables control of blade tip clearance (e.g., during startup) within the rotary machine.

Figure 3:
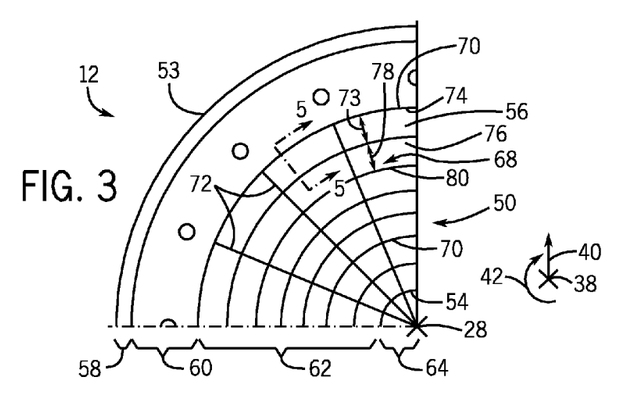
FIG. 3 is a partial side view of an embodiment of the rotor disk having the rotor disk heating system (e.g., spider web)

FIG. 3 is a partial side view of an embodiment of the rotor disk 12 having the rotor disk heating system 44 (e.g., spider web). The rotor disk 12 includes an outer perimeter 53, an inner perimeter 54, and an annular surface 56 disposed between the outer and inner perimeters 53, 54. The outer perimeter 53, inner perimeter 54, and the annular surface 56 extend 360 degrees in the circumferential direction 42 about the rotational axis 28. The rotor disk 12 also includes a dovetail region 58 for attachment of turbine blades 24 or compressor blades 32 to the rotor disk 12. In certain embodiments, the rotor disk 12 may include a bolted region 60 to couple the rotor disks 12 together. The rotor disk 12 also includes a main body region 62 and a bore region 64. The main body region 62 and/or the bore region 64 of the annular surface 56 may be restively heated by the rotor blade heating system 44 via the rotor disk heating device 50. The rotor disk heating device 50 includes a resistive network 68 disposed along the annular surface 56 of the main body region 62. In certain embodiments, the resistive network 68 may be disposed beneath the annular surface 56 within grooves etched into the annular surface 56 (see FIGS. 5 and 6). The resistive network 68 applies a low voltage, high current electrical signal to the rotor disk 12 to heat the main body region 62. As described in greater detail below, the resistive network 68 includes a multilayered heating material (see FIG. 5). The multilayered heating material includes a first dielectric layer having a high thermal conductivity (e.g., diamond powder) disposed on the annular surface 56 or within grooves (see FIG. 5) and a resistive heating layer disposed on the first dielectric layer. In certain embodiments, the multilayered heating material may include a second dielectric layer having a low thermal conductivity (e.g., thermal barrier coating (TBC) such as a ceramic blanket or environmental barrier coating) relative to the first dielectric layer disposed on the resistive heating layer for environmental protection and/or insulating purposes.

As depicted, the resistive network 68 includes a spider web design. In other embodiments, the resistive network 68 may be arranged in grid of small squares (see FIG. 4) or any other shape. As depicted, the resistive network 68 includes a plurality of concentric circles 70 having the multilayered heating material and a plurality of radial conductors 72 that couple to the concentric circles 70. Specifically, the radial conductors 72 extend in the radial direction 40 from the inner perimeter 54 towards the outer perimeter 53 across the plurality of concentric circles 70. Power is provided to the radial conductors 72 from the power supply 48 via one or more leads (not shown) coupled to the radial conductors 72. As mentioned above, the rotor disk heating system 44 may vary the heating between portions of the rotor disk 12. Varying the heating between portions of the rotor disk 12 may provide even heating across the rotor disk 12. In particular, a radial spacing between the concentric circles 70 may vary to provide even heating of the rotor disk 12. For example, a radial spacing 73 between conductors 74 and 76 is greater than a radial spacing 78 between conductors 76 and 80. The radial spacing between the concentric circles 70 may increase in the radial direction 40 to enable a greater amount of heat generation nearer the inner perimeter 54 (e.g., further away from the flow path), while enabling a lesser amount of heat generation further away from the inner perimeter 54 (e.g., nearer the flow path). The variable temperature compensation enables even heating of the one or more rotor disks 12 to increase the cyclic life of the rotor disks 12 as well as control of blade tip clearances.

Figures 4, 5:
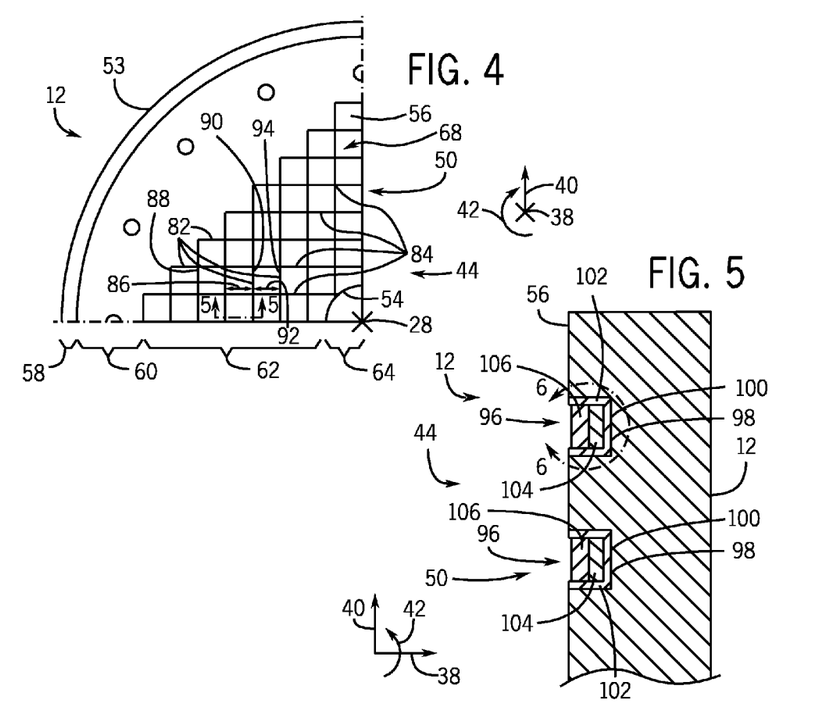
FIG. 4 is a partial side view of an embodiment of the rotor disk having the rotor disk heating system (e.g., grid)
FIG. 5 is a lateral cross-sectional view of an embodiment of the rotor disk having the rotor disk heating system that includes a multilayered heating material disposed within grooves, as indicated by line 5-5 of FIGS. 3 and 4.

FIG. 4 is a partial side view of an embodiment of the rotor disk 12 having the rotor disk heating system 44 (e.g., grid). In general, the rotor disk 12 and the rotor disk heating system 44 are as described in FIG. 3, except for the arrangement of the resistive network 68. As depicted, the resistive network 68 is arranged in a grid of rectilinear shapes. In other embodiments, the shapes may vary (e.g., triangle or any other shape). As depicted, the resistive network 68 includes a plurality of grid lines 82 having the multilayered heating material and a plurality of conductors 84 that couple to the grid lines 82. Specifically, the conductors 84 extend across the plurality of grid lines 82. Power is provided to the conductors 84 from the power supply 48 via one or more leads (not shown) coupled to the conductors 84. As mentioned above, the rotor disk heating system 44 may vary the heating between portions of the rotor disk 12. Varying the heating between portions of the rotor disk 12 may provide even heating across the rotor disk 12. In particular, a radial spacing between the grid lines 82 may vary to provide even heating of the rotor disk 12. For example, a radial spacing 86 between conductors 88 and 90 is greater than a radial spacing 92 between conductors 90 and 94. The radial spacing between the grid lines 82 may increase in the radial direction 40 to enable a greater amount of heat generation nearer the inner perimeter 54 (e.g., further away from the flow path), while enabling a lesser amount of heat generation further away from the inner perimeter 54 (e.g., nearer the flow path). The variable temperature compensation enables even heating of the one or more rotor disks 12 to increase the cyclic life of the rotor disks 12 as well as control of blade tip clearance.

Figure 6:
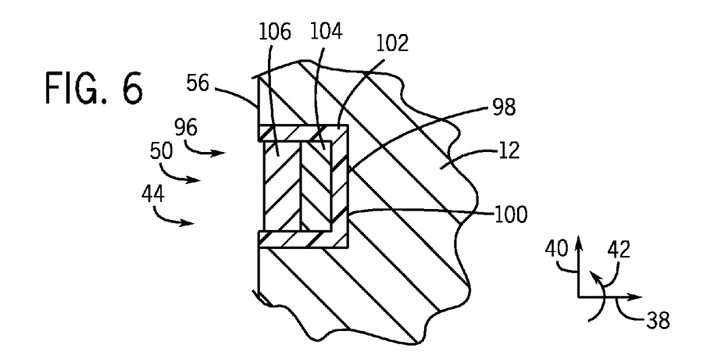
FIG. 6 is a detailed lateral cross-sectional view of an embodiment of the multilayered heating material disposed within one of the grooves, taken within line 6-6 of FIG. 5.

FIG. 5 is a lateral cross-sectional view of an embodiment of the rotor disk 12 having the rotor disk heating system 44 (e.g., rotor disk heating device 50) that includes a multilayered heating material 96 disposed within grooves 98, as indicated by line 5-5 of FIGS. 3 and 4. FIG. 6 is a detailed lateral cross-sectional view of an embodiment of the multilayered heating material 96 disposed within one of the grooves 98, taken within line 6-6 of FIG. 5. As depicted in FIG. 5, the rotor disk 12 includes a plurality of grooves 98 etched into the annular surface 56 of the rotor disk 12. While the depicted grooves 98 include a rectangular shape, in other embodiments, the shape of the grooves 98 may vary (e.g., concave, triangular, etc.). The grooves 98 extend into the rotor disk 12 in the axial direction 38 and along the rotor disk 12 in the circumferential direction 42. In addition, the grooves 98 are spaced relative to one another in the radial direction 40. Each groove 98 includes a surface 100 below the annular surface 56. Disposing the resistive network 68 below the annular surface 56 within the grooves 98 avoids interference between the resistive network 68 and the surfaces of other tightly fitted components (e.g., rabbet or other friction bearing components between the disks 12) within the rotary machine 42.

As depicted in FIGS. 5 and 6, the multilayered heating material 96 includes a first dielectric layer 102 having a high thermal conductivity disposed on the surface 100 of each groove 98. The thermal conductivity of the first dielectric layer 102 may range from approximately 1000 to 4000 W/(m·K) depending on the material. In certain embodiments, the first dielectric layer 102 may include a diamond powder. The diamond powder provides a number of benefits as the first dielectric layer. For example, the diamond powder includes among the benefits an extreme mechanical hardness, low compressibility, and a high thermal conductivity value at room temperature. In addition, diamond powder may be resistant to chemical erosion, exhibit low or negative electron affinity, act as a good electrical conductor, and be doped to change its resistivity. The diamond powder may be deposited on the rotor disks 12 via chemical vapor deposition or any other technique. The multilayered heating material 96 also includes a resistive heating layer 104 disposed on the first dielectric layer 102. The resistive heating layer 104 acts as a conductor that exhibits resistance in the area of the other resistive heating materials. For example, materials for the resistive heating layer 104 may include platinum, copper, nickel, tungsten, or any other metal or metal alloy (e.g., Nichrome, nickel-iron, iron-chromium-aluminum, copper-nickel, etc.). The resistivity of the resistive heating layer 104 may range from approximately $5 \times 10^{-8}$ to $1.496 \times 10^{-6}$ $\Omega \cdot m$ depending on the material. In certain embodiments, the multilayered heating material 96 includes a second dielectric layer 106 having a low thermal conductivity (e.g., relative to the first dielectric layer 102) disposed on the resistive heating layer 104 for environmental protection and/or insulating purposes. The thermal conductivity of the second dielectric layer 106 may range from approximately 0 to 2 W/(m·K) depending on the material. For example, the second dielectric layer 106 may include a thermal barrier coating such as a ceramic blanket.

Figure 7:
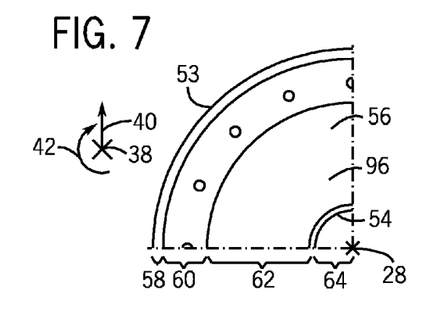
FIG. 7 is a partial side view and partial lateral view of an embodiment of the rotor disk having the rotor disk heating system disposed on an annular surface.
Figure 8:
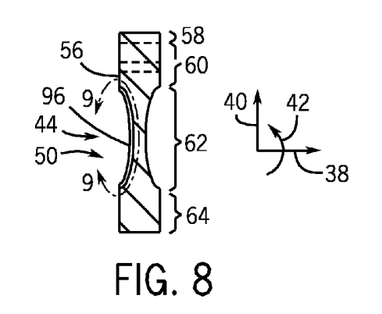
FIG. 8 is a partial lateral view of an embodiment of the rotor disk having the rotor disk heating system disposed on an annular surface.
Figure 9:
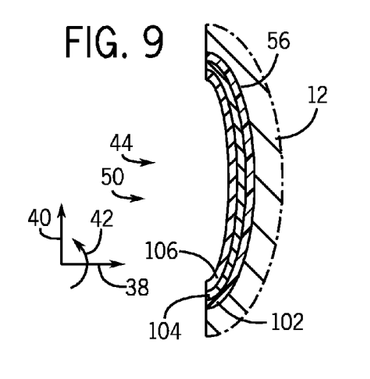
FIG. 9 is a detailed lateral view of an embodiment of the multilayered heating material disposed on the annular surface, taken within line 9-9 in FIG. 8.

FIGS. 7 and 8 are a partial side view and partial lateral view, respectively, of an embodiment of the rotor disk 12 having the rotor disk heating system 44 (e.g., rotor disk heating device 50) disposed on the annular surface 56. FIG. 9 is a detailed lateral view of an embodiment of the multilayered heating material 96 disposed on the annular surface 56, taken within line 9-9 in FIG. 8. The rotor disk 12 is as described in FIG. 3. As illustrated, the main body region 62 of the rotor disk 12 is generally concave with respect to the annular surface 56. The rotor disk heating system 44 includes the multilayered heating material 96 disposed along main body region 62. The concave main body region 62 avoids interference between the multilayered heating material 96 and the surfaces of other tightly fitted components (e.g., rabbet or other friction bearing components between the disks 12) within the rotary machine 42. The multilayered heating material 96 forms a continuous layer along the annular surface 56 of the main body region 62. Power is provided to the multilayered heating material 96 from the power supply 48 via one or more leads (not shown) coupled to the multilayered heating material 96. The multilayered heating material is as described above in FIGS. 5 and 6. In particular, the first dielectric layer 102 is disposed on the annular surface 56 of the rotor disk 12 and the resistive heating layer 104 is disposed on the first dielectric layer 102. In certain embodiments, the multilayered heating material 96 includes the second dielectric layer 106 having a low thermal conductivity disposed on the resistive heating layer 104 for environmental protection and/or insulating purposes. The variable temperature compensation provided by the rotor disk heating system 44 enables even heating of the one or more rotor disks 12 to increase the cyclic life of the rotor disks 12 as well as control of blade tip clearance.

Figure 10:
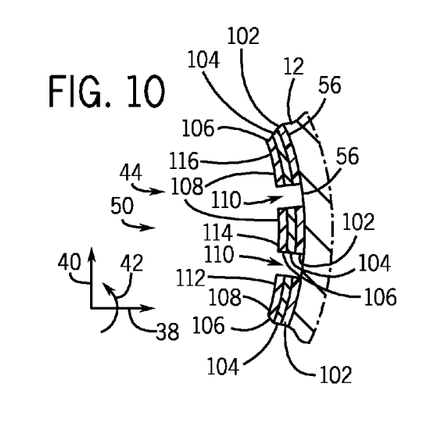
FIG. 10 is a detailed lateral view of an embodiment of the multilayered heating material (e.g., segmented) disposed on the annular surface, taken within line 9-9 of FIG. 8.

FIG. 10 is a detailed lateral view of an embodiment of the multilayered heating material 96 (e.g., segmented) disposed on the annular surface 56, taken within line 9-9 of FIG. 8. The rotor disk 12 is as described in FIG. 3. As depicted, the multilayered heating material 96 is segregated into a plurality of separate sections 108 via gaps 110. In certain embodiments, the sections 108 may vary in size (e.g., width length, thick, area, etc.). In other embodiments, the sections 108 may have the same size. In certain embodiments, the separate sections 108 allow the applied electrical current or voltage to be varied independently (e.g., via controller 46) to vary the heating between the between the sections 108. For example, a higher electrical current may be applied to section 112 (e.g., further away from the flow path) than the other sections 114, 116 (e.g., nearer the flow path). Also, a higher electrical current may be applied to section 114 (e.g., further away from the flow path) than section 116 (e.g., nearer the flow path). Thus, a greater amount of heat generation (via the rotor disk heating system 44) nearer the inner perimeter 54 may occur (e.g., further away from the flow path), while enabling a lesser amount of heat generation further away from the inner perimeter 54 (e.g., nearer the flow path). The variable temperature compensation enables even heating across the one or more rotor disks 12 to increase the cyclic life of the rotor disks 12.

Figure 11:
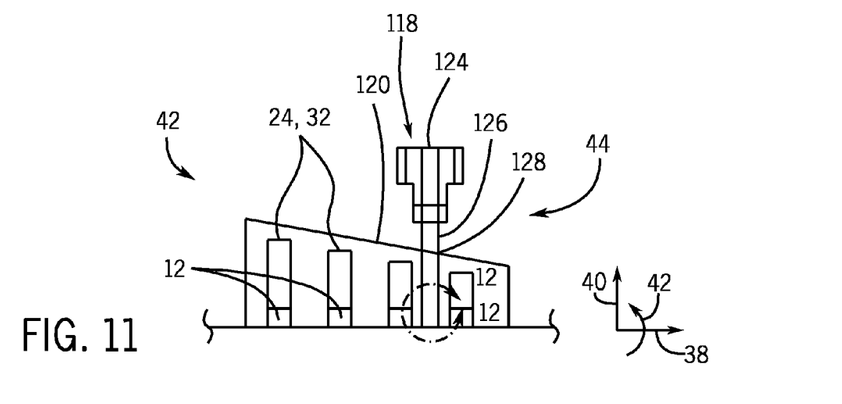
FIG. 11 is a schematic view of an embodiment of a removable probe inserted within a casing of a rotary machine to provide power for a rotor disk heating system.
Figure 12:
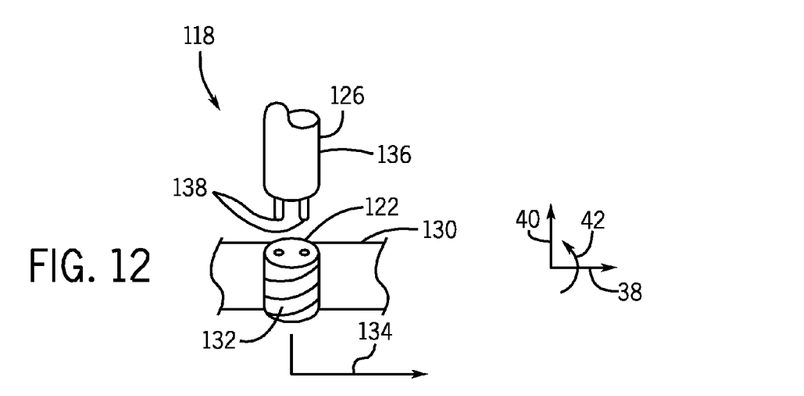
FIG. 12 is a detailed schematic view of an embodiment of the removable probe and a socket that provide power for the rotor disk heating system, taken within line 12-12 of FIG. 11.

As mentioned above, the power for the rotor disk heating system 44 may be provided by a removable probe 118. FIG. 11 is a schematic view of an embodiment of the removable probe 118 inserted within a casing 120 of the rotary machine 42 (e.g., compressor 14 or turbine 20) to provide power for the rotor disk heating system 44. FIG. 12 is a detailed schematic view of an embodiment of the removable probe 118 and a socket 122 that provide power for the rotor disk heating system 44, taken within line 12-12 of FIG. 11. The probe 118 provides power for heating one or more rotor disks 12, particularly, while the rotor disks 12 of the rotary machine 42 are at rest (e.g., prior to a cold start event). The probe 118 includes an actuator portion 124 and an extension portion 126. The extension portion 126 is configured to be inserted within the casing 120 of the rotary system 42 via a port 128 (e.g., in radial direction 40). The port 128 may be an existing port (e.g., borescope port) or a custom port designed for the probe 118. The casing 120 includes one or more ports 128. The probe 118 is configured to couple with the socket 122 to provide power for the rotor disk heating system 44. The socket 122 is located within a spacer 130 disposed adjacent the rotor disk 12 to be heated. In some embodiments, the socket 122 includes threads 132 to facilitate easy replacement of the socket 122. In certain embodiments, the rotary machine 42 includes multiple sockets 122 for heating the rotor disks 12. In other embodiments, the rotary machine 42 includes a single socket 122 to enable heating of one or more rotor disks 12. One or more leads 134 run from the socket 122 to the rotor disk 12 to be heated. In embodiments with the single socket 122, one or more leads 134 may run from the socket 122 to multiple rotor disks 12. A distal end 136 (e.g., relative to the actuator portion 124) of the extension portion 126 includes one or more leads 138 (e.g., power leads, control leads, etc.) that plug into the socket 122. Once the extension portion is plugged into the socket 122, power is provided to the rotor disk heating system 44 (e.g., rotor disk heating device 50) via the leads 134. In certain embodiments, the extension portion 128 is retractable (e.g., in the radial direction 140). For example, the actuator portion 124 may be an air, hydraulic, or electrical driven actuator to retract or extend the extension portion 126. Also, other means may drive the actuator portion 124. As described above, the probe 118 may include the controller 46. In addition, the probe 118 may include sensors 52 to provide feedback to the probe 118. The probe 118 acts in conjunction with the rest of the rotor disk heating system 44 to provide variable temperature compensation for even heating of the one or more rotor disks 12 to increase the cyclic life of the rotor disks 12.

Technical effects of the disclosed embodiments include systems for heating the rotor disks 12 of rotary machines 42 (e.g., compressor 14 or turbine 20). In particular, the systems include the rotor heating system 44 to resistively heat rotor disks 12 via a low voltage, high current electrical signal. The current or voltage is applied to the rotor disks 12 via the rotor disk heating device 50 disposed on the rotor disks 12. The rotor disk heating device 50 may include the resistive network 68 (e.g., disposed within grooves 98 beneath the annular surface 56 of the rotor disks 12) or continuous layer of the multilayered heating material 96. The rotor heating system 44 enables varied temperature compensation and, thus, even heating of the rotor disks 12 to increase their cyclic life. In addition, the rotor heating system 44 enables control of blade tip clearance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a turbomachine, comprising:
at least one rotor disk; and
a rotor disk heating system configured to resistively heat at least a portion of the at least one rotor disk via an electrical current or voltage applied to the portion of the at least one rotor disk, wherein the rotor disk heating system comprises a socket coupled to the at least one rotor disk, and a removable probe configured to couple to the socket to provide power to heat the at least one rotor disk while the at least one rotor disk is at rest.

2. The system of claim 1, wherein the rotor disk heating system is configured to vary the heating between portions of the at least one rotor disk.

3. The system of claim 1, wherein the rotor disk heating system comprises a resistive network disposed on the at least one rotor disk, wherein portions of the resistive network comprise a multilayered heating material, and the resistive network is configured to apply the electrical current or voltage to the at least one rotor disk.

4. The system of claim 3, wherein the at least one rotor disk comprises an annular surface having an inner perimeter and an outer perimeter, and grooves within the annular surface, wherein the resistive network is disposed within the grooves below the annular surface.

5. The system of claim 4, wherein the multilayered heating material comprises at least a dielectric layer having a thermal conductivity and a resistive heating layer, and wherein the dielectric layer is disposed on a surface of each groove and the resistive heating layer is disposed on the dielectric layer.

6. The system of claim 3, wherein the resistive network comprises a plurality of concentric circles having the multilayered heating material, and a plurality of radial conductors that radially extend from an inner perimeter towards an outer perimeter of the annular surface across the plurality of concentric circles.

7. The system of claim 6, wherein a radial spacing between the plurality of concentric circles varies to provide even heating of the at least one rotor disk.

8. The system of claim 1, wherein the at least one rotor disk comprises an annular surface, and the rotor disk heating system comprises a first dielectric layer having a thermal conductivity continuously disposed on at least a portion of the annular surface.

9. The system of claim 8, wherein the first dielectric layer comprises a diamond powder.

10. The system of claim 9, wherein the rotor disk heating system comprises a resistive heating layer continuously disposed on the first dielectric layer.

11. The system of claim 1, wherein the rotor disk heating control system comprises at least one sensor, and a controller configured to control the electrical current or voltage applied to the at least one rotor disk based on feedback from the at least one sensor.

12. The system of claim 1, wherein the turbomachine comprises a compressor or a turbine having the at least one rotor disk.

13. A system, comprising:
a rotary machine, comprising:
at least one rotor disk, wherein the at least one rotor disk comprises an annular surface having an inner perimeter and an outer perimeter, and grooves within the annular surface; and
a rotor disk heating system comprising a resistive network disposed within the grooves below the annular surface, wherein portions of the resistive network comprise a multilayered heating material, and the resistive network is configured to resistively heat at least a portion of the at least one rotor disk via an electrical current or voltage, and wherein the resistive network comprises a plurality of concentric circles having the multilayered heating material, and a plurality of radial conductors that radially extend from the inner perimeter towards the outer perimeter of the annular surface across the plurality of concentric circles.

14. The system of claim 13, wherein the multilayered heating material comprises at least a dielectric layer having a thermal conductivity and a resistive heating layer, and wherein the dielectric layer is disposed on a surface of each groove and the resistive heating layer is disposed on the dielectric layer.

15. A system, comprising:
a turbomachine, comprising:
at least one rotor disk; and
a rotor disk heating system configured to resistively heat at least a portion of the at least one rotor disk via an electrical current or voltage applied to the portion of the at least one rotor disk, wherein the rotor disk heating system comprises a resistive network disposed on the at least one rotor disk, wherein portions of the resistive network comprise a multilayered heating material, and the resistive network is configured to apply the electrical current or voltage to the at least one rotor disk, and wherein the resistive network comprises a plurality of concentric circles having the multilayered heating material, and a plurality of radial conductors that radially extend from an inner perimeter towards an outer perimeter of the annular surface across the plurality of concentric circles.

* * * * *